United States Patent
Ulyanov

(10) Patent No.: US 9,923,430 B2
(45) Date of Patent: Mar. 20, 2018

(54) ACTUATOR OF ENGRAVING MACHINE

(71) Applicant: Igor Oleksandrovych Ulyanov, Mykolayiv (UA)

(72) Inventor: Igor Oleksandrovych Ulyanov, Mykolayiv (UA)

(73) Assignee: NPF Radian Limited Liability Company, Mykolayiv (UA)

( * ) Notice: Subject to any disclaimer, the term of this patent is extended or adjusted under 35 U.S.C. 154(b) by 314 days.

(21) Appl. No.: 14/957,851

(22) Filed: Dec. 3, 2015

(65) Prior Publication Data
US 2016/0336833 A1 Nov. 17, 2016

(30) Foreign Application Priority Data
May 15, 2015 (UA) .................. 201504713

(51) Int. Cl.
| | | |
|---|---|---|
| *H02K 7/14* | (2006.01) | |
| *B44B 3/00* | (2006.01) | |
| *H02K 41/035* | (2006.01) | |
| *B44B 3/06* | (2006.01) | |

(52) U.S. Cl.
CPC .............. *H02K 7/145* (2013.01); *B44B 3/00* (2013.01); *B44B 3/009* (2013.01); *B44B 3/063* (2013.01); *H02K 41/0356* (2013.01); *H02K 7/14* (2013.01)

(58) Field of Classification Search
CPC .......... B44B 3/00; B44B 3/005; H02K 7/145; H02K 7/14; H02K 41/0356; H02K 33/02; H02K 33/12
USPC .............................. 310/23, 34, 30, 14, 12.16
See application file for complete search history.

(56) References Cited

U.S. PATENT DOCUMENTS 1,284,930 A * 11/1918 Roberts .................. H02K 33/10
310/34

FOREIGN PATENT DOCUMENTS

| RU | 2121444 C1 | * 11/1998 |
| RU | 90379 U1 | * 1/2010 |

OTHER PUBLICATIONS

Potapov (RU 90379 U1) English Translation.*
Bocharov (RU 2121444 C1) English Translation.*

* cited by examiner

*Primary Examiner* — Quyen Leung
*Assistant Examiner* — Robert E Mates
(74) *Attorney, Agent, or Firm* — Aleksandr Smushkovich

(57) ABSTRACT

The proposed actuator of engraving machine relates to decorative machining of hard materials, and can be used in arrangement of facades and monuments. A permanent magnet and a core with a pivot are concentrically fixed in an upper part of a housing. An electric coil is placed on a cylindrical frame of nonmagnetic material and can move in the axial direction in a ring gap between the core and the permanent magnet together with a pusher fixed in two circular elastic membranes, spaced in the axial direction and fixed in the housing along an external contour. A shank is fixed on the pusher under the membranes, having a central part extending through a bottom cover of the housing. It has a hollow axial opening, wherein a removable impact tool is mounted. The design is simple and reliable. Durability, accuracy and speed of engraving of the actuator are improved.

7 Claims, 4 Drawing Sheets

ACTUATOR OF ENGRAVING MACHINE

CROSS-REFERENCE TO RELATED APPLICATIONS

This U.S. patent application claims priority under 35 U.S.C. 119 (a) through (d) from a Ukrainian patent application UA u201504713 filed on 15 May 2015.

BACKGROUND OF THE INVENTION

This invention relates to devices for decorative processing of hard materials, and it can be used in arrangement of facades, monuments, and interior decorations.

There is known a device for application of a grayscale image on a flat surface of the polished item described in a patent No. 2121444 of the Russian Federation issued on Nov. 10, 1998, Int.Cl. B44B3/00, consisting of a computer with a unit of preparation and information input, an actuator comprising an impact tool with a vertical drive connected via the control unit with a vertical drive to the computer, horizontal drives of the actuator in the coordinates X and Y linked to the vertical drive and connected to the computer via the electronic control devices, and a clamp device with a work piece; and also a electrodynamic vertical drive of the impact tool was used as a vertical drive, which includes a coil wound on the side surface of the dielectric cylinder actuator, which is movable relative to its housing, and on the free end of which there is a rigidly fixed holder of the impact tool that is attached to the housing of the actuator with the elastic suspensions; additionally, the parameter controller device of the vertical motion of the impact tool is placed into the feedback circuit and the control unit of the electrodynamic vertical drive of the impact tool, and an impact point coordinate sensor is mechanically connected with a horizontal drive device of the actuator in the X coordinate.

The disadvantage of the aforementioned device is that elastic suspensions, made of rubber according to the description, have small radial and axial stiffness. This causes the distortion in the radial direction of the coil wound on the side surface of the dielectric cylinder actuator, which is movable relative to its housing, with a holder of the impact tool rigidly fixed on the free end, which is a working stroke in the moment of the axial movement. As the coil wound on the side surface of the dielectric cylinder actuator, which is movable relative to its housing, with a holder of the impact tool rigidly fixed on the free end is placed in the magnetic gap between a permanent magnet and a core with a pivot, a distortion in the radial direction will cause grinding or even mechanism jamming, which makes impossible to perform a high quality engraving.

The most similar to the present invention is an actuator of engraving machine described in a utility model No. 90379 of the Russian Federation issued on Mar. 10, 2010, Int.Cl.B44B 3/00, consisting of a housing, a cylindrical magnet, a core with a pivot, a dielectric cylinder, an electric coil, an impact tool; a cylindrical magnet and a core pivot are installed between an upper and lower covers, the last of which is attached of the housing, opposite to the core pivot; a ring-type magnetic circuit is installed between a cylindrical magnet and the lower cover, an electric coil is placed on the cylindrical frame made of bronze, a core shank is installed in the opening of the frame with a possibility of the axial movement of the frame towards a core; a dielectric cylinder is pressed in the lower part of the coil frame, and two semi-circular longitudinal grooves are made on the outer surface of the dielectric cylinder, and a rod shank is screwed firmly in the lower part of the dielectric cylinder in its collar, and a lower part of the rod is made in the form of plunger mounted in the bronze guide bush and centering by the outer surface a supporting housing rod attached to the last one, an axle beam of the machine and a beam clamping, an impact tool is firmly attached to the lower part of the a rod plunger, a replaceable bush of the impact tool amplitude limitation is installed in the opening of the housing pivot.

The actuator, in which an electronic coil is connected to the controller, is managed by the processor. A needle made of hard alloy BK8 B is used as an impact tool. A needle made of hard alloy BK15 is used as an impact tool.

The common essential feature is an actuator of the engraving machine comprising an engraving head with a ring-type magnet in the housing, a ring-type magnetic circuit of the washer, a core with a pivot, an electric coil connected to the control system, and an impact tool.

The disadvantage is the centering carried out by the plunger sliding in the bush opening, but the electric coil is installed at a distance, which is three times greater than the conjugation length with a plunger bush that causes jamming in case of distortions, as well as friction and wear of the electric coil frame or on the shank, or on the walls of the magnetic circuit opening, which reduces the engraving accuracy, reliability and durability of the work, and despite the installation of the protective inelastic membranes an abrasive can penetrate through the cracks on the friction surface.

SUMMARY OF THE INVENTION

A very important aim of the invention is to simplify the design, increase reliability and durability of the device, improve accuracy and speed of the engraving process.

According to preferred embodiments, the inventive actuator of engraving machine comprises: an engraving head with a ring-shaped magnet located in a housing, a ring-shaped magnetic circuit washer, a core with a pivot, an electric coil connected to a control system and a removable impact tool, wherein a ring-shaped permanent magnet and the core with the pivot are concentrically mounted in an upper part of the housing in a sleeve with an upper support flange, directly connected with an end and inside housing walls of the c engraving head, the electric coil is placed on a cylindrical frame made of nonmagnetic material and located such that can be moved in the axial direction in a ring gap between the core and the ring-shaped permanent magnet together with a pusher that is coupled with two circular elastic membranes, spaced in the axial direction and fixed in the housing along an external contour of the membranes, and wherein a shank is fixed on the pusher with a central part extending through a bottom cover of the housing with a hollow axial opening, wherein the impact tool is mounted.

A ring-shaped magnetic circuit of the washer is installed inside the sleeve on the lower end of the ring-type permanent magnet and its lower ridge coincides with the core end flat surface.

The cylindrical frame of the electrical coil made of nonmagnetic metal can be integrated with the pusher in one solid component, having an open slot along the entire height of the moving line, and a mating part of a position sensor is mounted in the lower part of the cylindrical frame, which is installed in the housing of the engraving head and connected to the control system.

The cylindrical frame of the electrical coil is made of nonmagnetic material with a flange, which can be attached to the pusher, and the mating part of the position sensor is mounted on the flange, which is installed in the housing of the engraving head and connected to the control system.

The range of axial movement of the pusher and device components connected thereto is limited upwards with a gap up to the adjusting screw, mounted on the core with the pivot inside the frame of the electrical coil, and downwards with a gap in the axial direction between a part of the shank, made with a stepped larger diameter and the inside end surface of the lower cover.

The impact tool is made of magnetic material and is fixed in the hollow axial opening of the shank secured with a magnet there, and has a support stepped expansion. A polymer ring gasket is installed at the end of the support stepped expansion.

Spacer bushings are installed on the pusher between the elastic membranes with the ring ridges or other symmetrically located corrugations. Along the external contour, the membranes are crimped by rings. Along the internal contour, the membranes are fixed to the pusher with rings crimped by a shank installed on the threaded end of the pusher. The membranes are made of textile material impregnated with a Bakelite lacquer or polymer binder.

The distinctive essential features of the invention are: in the upper part of the engraving head's housing in the sleeve with an upper support flange, directly connected with an end and inside housing walls of the c engraving head, a ring-shaped permanent magnet and a core with a pivot are concentrically fixed at the top, an electric coil placed on the cylindrical frame made of the nonmagnetic material and located with an opportunity to be moved in the axial direction in the ring gap between the core and a ring-shaped permanent magnet together with a pusher that is fixed in two circular elastic membranes, which are spaced between each other in the direction of the axial line and fixed in the housing by the outer contour, and a shank is fixed on the pusher under the membranes with an central part extending through a bottom cover of the housing with a hollow axial opening, in which a removable impact tool is mounted.

The distinctive essential features are also a ring-type magnetic circuit of the washer installed inside the sleeve on the lower end of the ring-shaped permanent magnet and its lower ridge coincides with the core end flat surface.

The cylindrical frame of the electrical coil made of nonmagnetic metal can be designed with the pusher as a whole, having an open slot along the entire height of the moving line, and the mating part of the position sensor is mounted on the lower part of the cylindrical frame, installed on the housing of the engraving head and connected to the control system.

Another embodiment envisages that the cylindrical frame of the electrical coil can be made of nonmagnetic material with a flange, which can be attached to the pusher, and the mating part of the position sensor is mounted on the flange, which is installed on the housing of the engraving head and connected to the control system.

The range of the axial movement of the pusher and device's components connected thereto is limited upwards, with a gap up to the adjusting screw, mounted on the core with a pivot inside the frame of the electrical coil, and downwards with a gap in the axial direction between a part of the shank, made with a stepped larger diameter and the inside end surface of the bottom cover.

The impact tool is made of magnetic material and is fixed in the hollow axial opening of the shank secured with a magnet there, and has a support stepped expansion. At the end of the support stepped expansion, a polymer ring gasket is installed.

Between the elastic membranes with the ring ridges or other symmetrically located corrugations, the spacer bushings are installed on the pusher, and outside the membranes are crimped by the rings. The membranes are fixed to the pusher with rings compressed with a shank installed on the threaded end of the pusher. The membranes are made of the textile material impregnated with a Bakelite lacquer or polymer binder.

Kinematic accuracy and improved speed of the engraving process, as well as movements without friction, jamming or hooks (which also increases reliability and durability of operation as there are no friction joints, and abrasive particles during the engraving cannot spoil anything in the device) are provided due to the following design features: in the upper part of the engraving head housing in the sleeve with an upper support flange, directly connected with an end and inside housing walls of the c engraving head, a ring-shaped permanent magnet and a core with a pivot are concentrically fixed at the top, an electric coil is placed on a cylindrical frame made of nonmagnetic material and located such that can move in the axial direction in the ring gap between the core and the ring-shaped permanent magnet together with the pusher fixed in two circular elastic membranes, which are spaced in the axial direction and fixed in the housing along the external contour.

A shank is fixed on the pusher with the membranes with a central part extending through the lower cover of the housing with a hollow axial opening, in which an impact tool is mounted with a possibility of easy and quick disconnection, and that enables to simplify the replacement of the impact tool and reduce a pressure on the membranes during the replacement preventing their damage.

BRIEF DESCRIPTION OF DRAWINGS OF THE INVENTION

DETAIL DESCRIPTION OF PREFERRED EMBODIMENTS OF THE INVENTION

Figure 1:
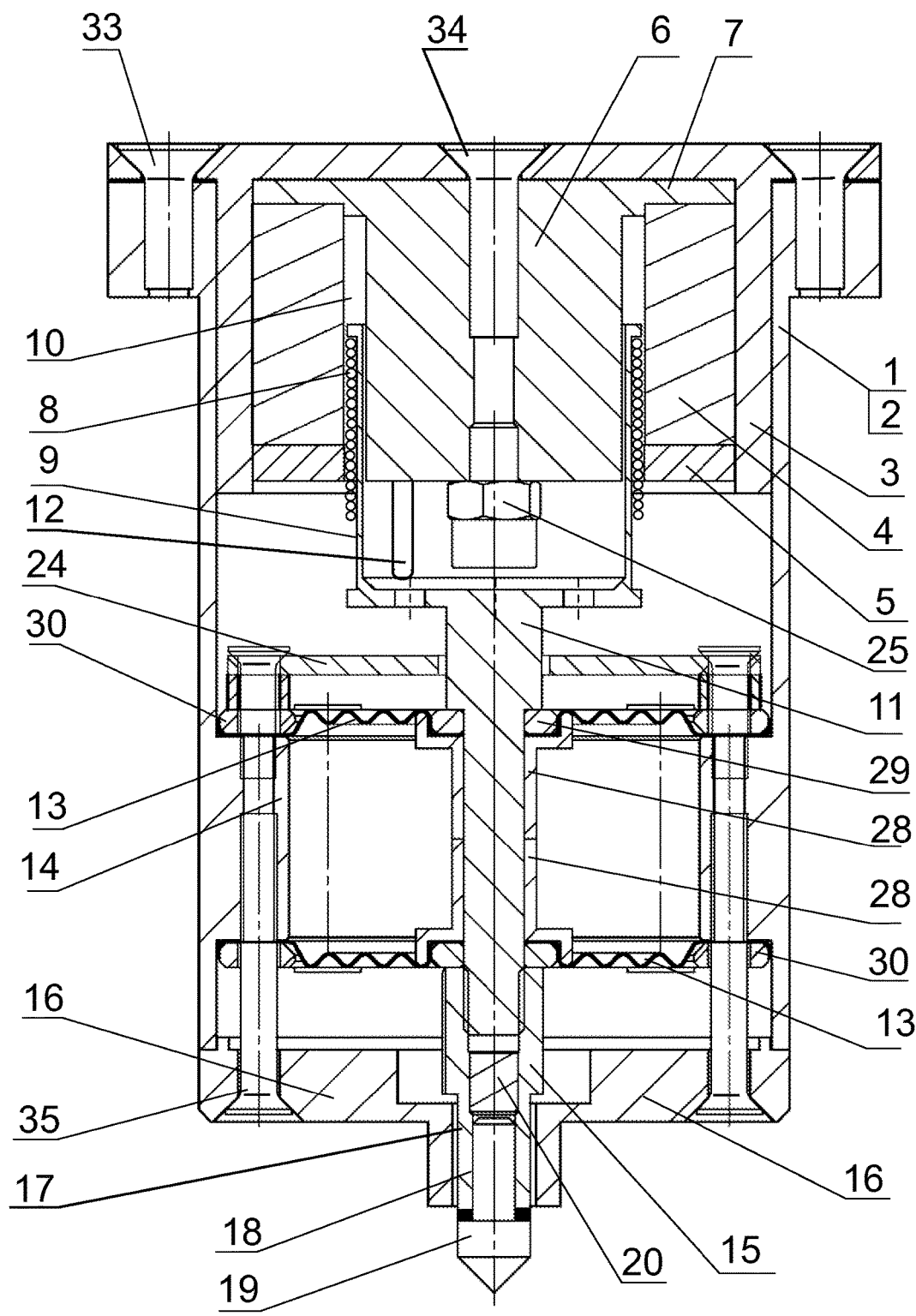
FIG. 1 shows a longitudinal section of the inventive engraving head.

While the invention may be susceptible to embodiment in different forms, there are shown in the drawings, and will be described in detail herein, specific embodiments of the present invention, with the understanding that the present disclosure is to be considered an exemplification of the principles of the invention, and is not intended to limit the invention to that as illustrated and described herein.

In a preferred embodiment of the invention, an actuator of engraving machine comprises: an engraving head 1, including a housing 2 wherein a sleeve 3 is installed, containing a ring-shaped permanent magnet 4, a ring-shaped magnetic circuit washer 5, a core 6 (made of material conducting magnetic flux) with a pivot 7, an electrical coil 8 wound on a cylindrical frame (or carcass) 9 made of nonmagnetic material and connected to a control system, and located with a capability of movement in the axial direction in a ring gap 10 arranged between the core 6 and the ring-type permanent magnet 4, and a ring-shaped magnetic circuit of the washer 5. A bottom of the housing 2 is closed by a bottom cover 16 having a central orifice.

The cylindrical frame 9 of the electrical coil 8 can be fixedly or detachably connected with a pusher 11. The pusher 11 has an open slot 12 along the entire height of the moving line of the cylindrical frame 9. The pusher 11 is fixed in two circular elastic membranes 13, which are spaced between each other in the direction of the axial line and fixed along an inner ledge by an external contour 14 in the housing 2.

A shank 15 is fixed on the pusher 11 below the membranes 13. The shank 15 has a central part 17 with a hollow axial opening 18, while the central part 17 projects through the orifice of the bottom cover 16. A removable impact tool 19, being made of magnetic material, is placed in the axial opening 18 and secured there with a permanent magnet 20. In another embodiment of the inventive actuator, the shank 15 can be secured in a lower part of the pusher 11 by means of a screw-threaded attachment.

On the lower part of the cylindrical frame 9, a mating part 22 of a position sensor 23 is mounted, which is installed on a plate 24, disposed in the housing 2 of the actuator and connected to the control system.

The range of axial movement of the pusher 11 and parts connected thereto is limited upwards with a gap up to an adjusting screw 25, mounted on the core 6 with the pivot 7 inside the frame 9 of the electrical coil 8, and downwards with a gap in the axial direction between a stepped ledge (or a shoulder located above the central part 17) of the shank 15 made with a diameter larger than a diameter of the orifice made in the bottom 16 and the inside butt end surface of the bottom cover 16.

Figure 2:
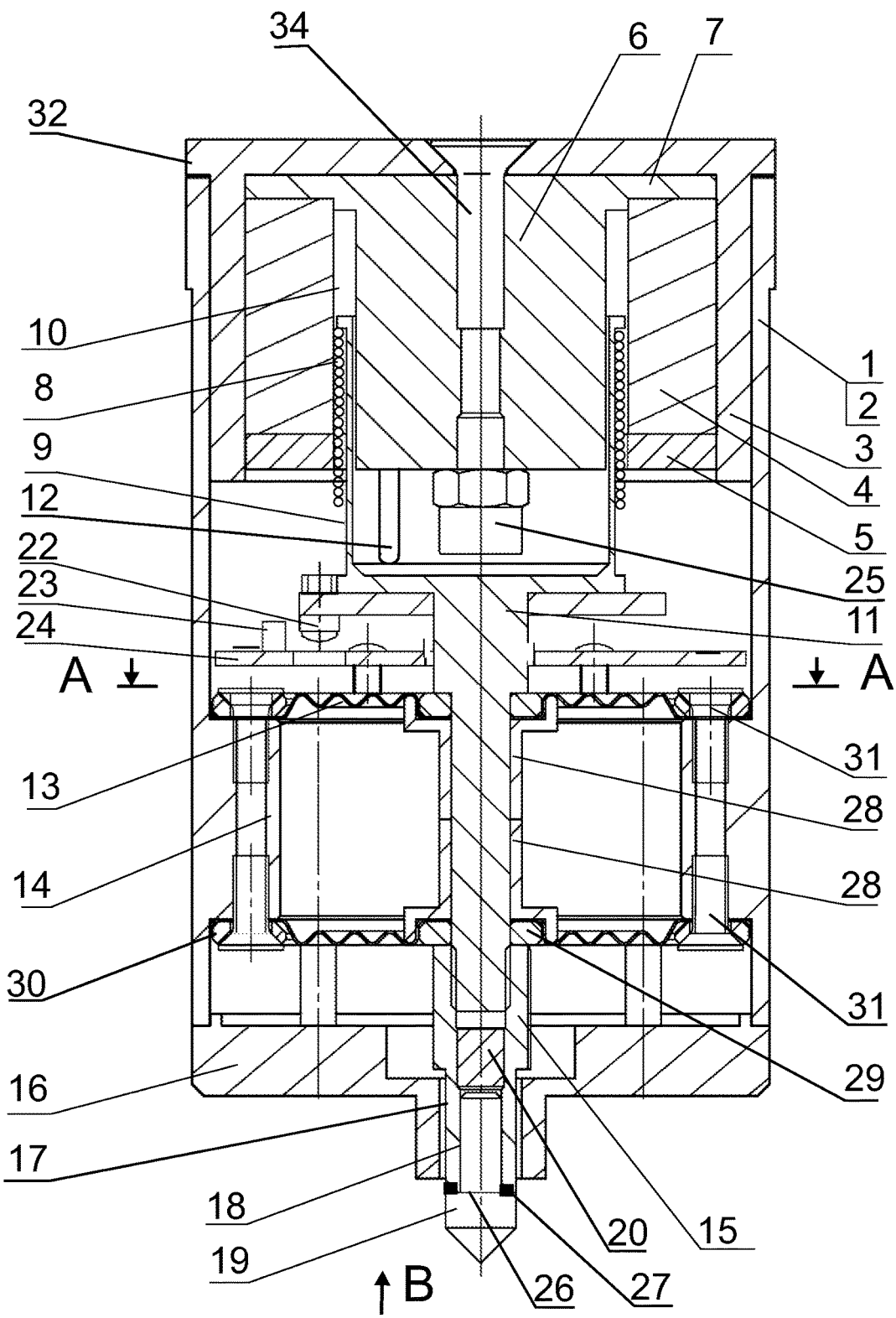
FIG. 2 shows a section of the inventive engraving head rotated at 45 degrees.
Figure 3:
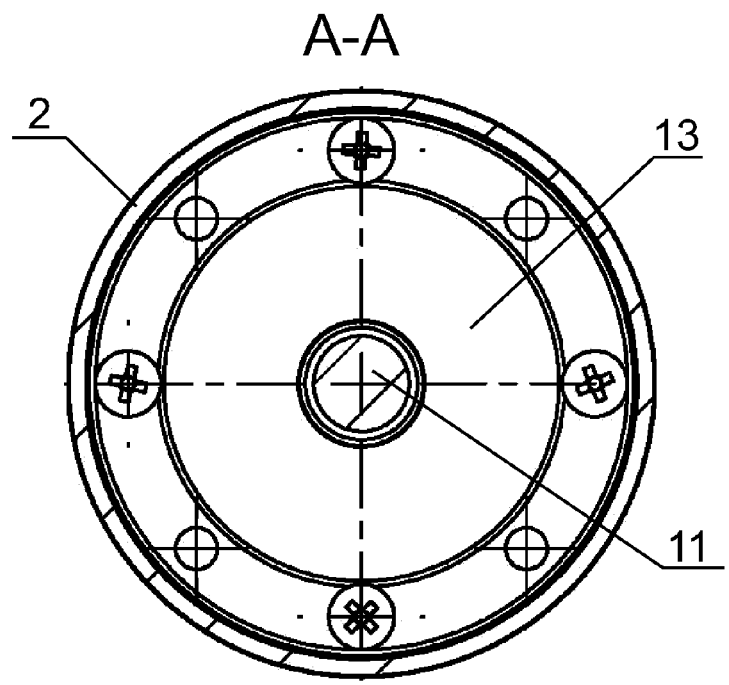
FIG. 3 shows a section A-A.
Figure 4:
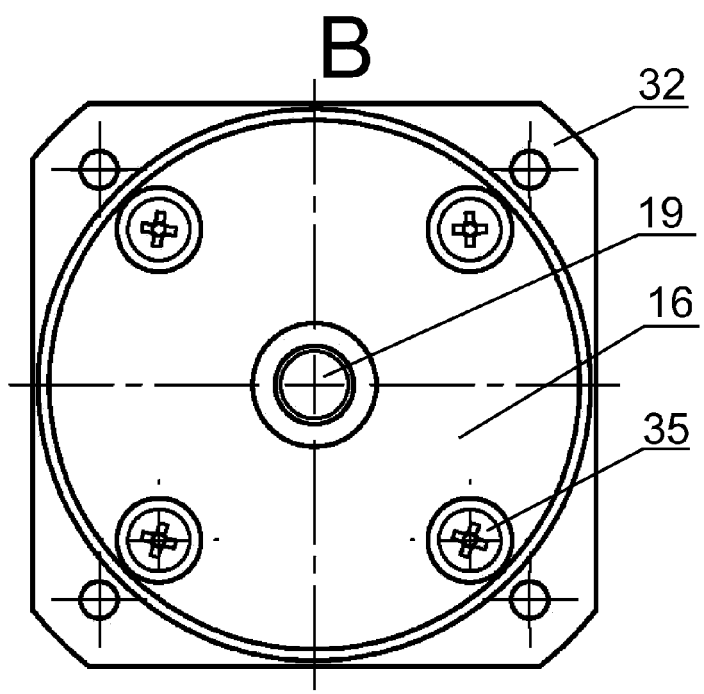
FIG. 4 shows a bottom view B.

The impact tool 19 has a support stepped expansion 26 (FIG. 2), a polymer ring gasket 27 is installed on the support stepped expansion.

Between the elastic membranes 13 configured with symmetrically situated ring crimps (ridges), spacer bushings 28 are installed on the pusher 11, and outside the membranes 13 are crimped by rings 29 with rounded wedges, and also rings 30 are crimped by screws 31; wherein the membranes 13 made of textile material impregnated with a Bakelite lacquer or polymer binder with a possibility of using metal crimped membranes.

The sleeve 3 has an upper support flange 32 and is fixed on the housing 2 with screws 33, and the core 6 is fixed to the sleeve 3 with a screw 34. The cover 16 is fixed on the housing 2 with screws 35.

Figure 5:
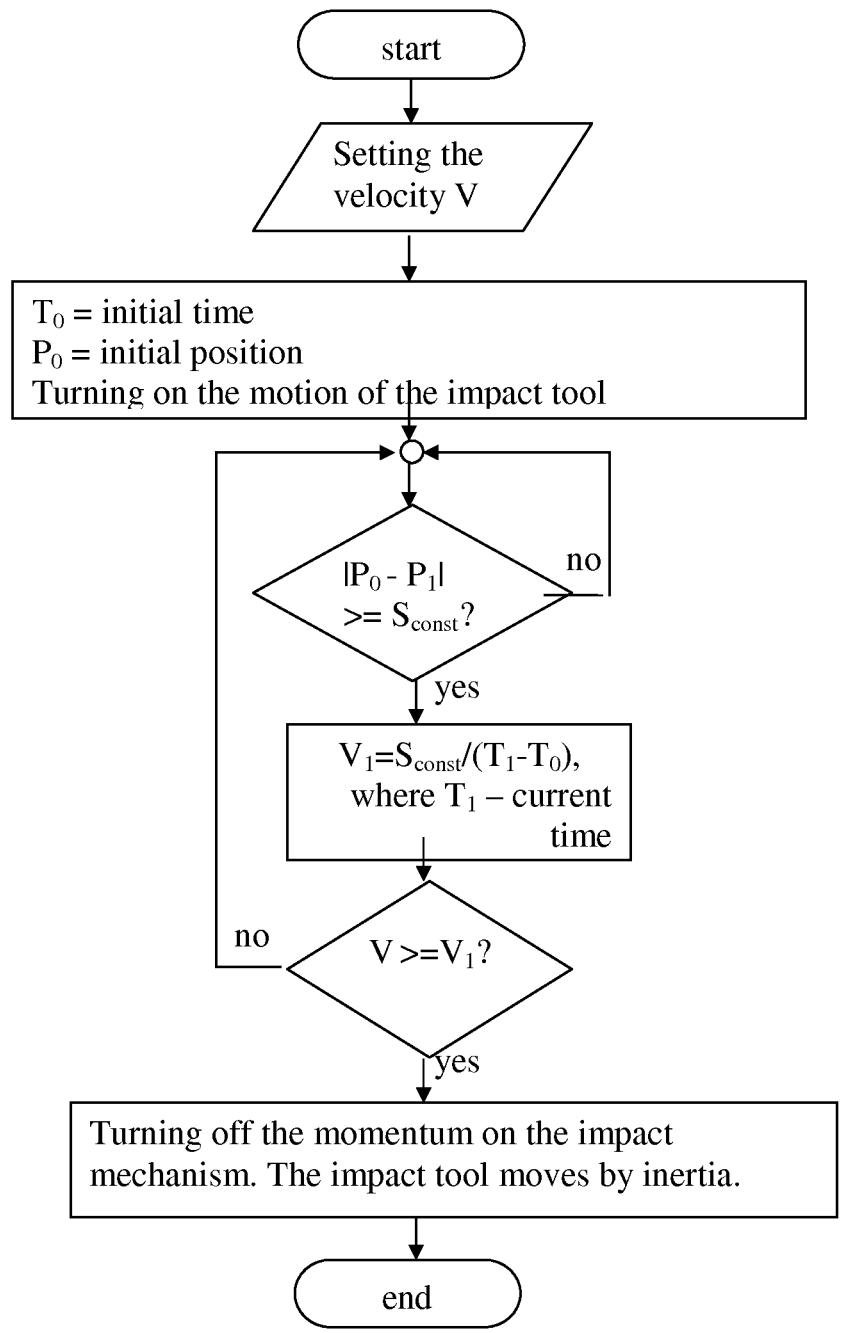
FIG. 5 shows an algorithm diagram for operation of the impact tool.

The use of the position sensor 22 of the impact tool 19 in the axial direction (which can be a Hall sensor, or, for example, optical, inductive or capacitive sensors), enables the control system (see FIG. 5) to receive actual values of impact tool positions (P), its velocity (V) and movement direction, and capture the impact moment. A detailed electric circuit and computer program are not disclosed, since they are not a subject of the invention, and are clear to those skilled in the art. For an explanation of operation of the actuator, FIG. 5 shows a flowchart of the algorithm for operation of the impact tool, through calculating a velocity by a method for measuring transmission time of a fixed path (V=Sconst/T).

The availability of these data enables the control system to monitor and control the power of impact, to minimize the amplitude value of the impact mechanism, to increase the engraving speed, to control directly and stabilize the gap between the impact mechanism and processed surface without applying additional hardware and/or software and hardware.

As the velocity (V) is a ratio of the passed path (S) for the time (T), then the velocity can be calculated by two methods:
1. Calculating the passed path for a certain time: V=S/Tconst.
2. Calculating time of the passed fixed path V=Sconst/T.
The choice of calculating method is determined by hardware and software capabilities of the control system.

The passed path (S) is calculated as the position difference of the impact mechanism obtained between the measurement intervals: $S=P_0-P_1$. The obtained difference sign indicates the movement direction.

In a general case, the passed path is a number, determined by the used hardware and software. The used hardware and software determine the accuracy of position measurement and the range of possible values.

Considering that the implementation of the position measurement in the engraving mechanism with values more precisely than a few micrometers is technically difficult and unreasonably expensive, and the fact that the measured movement in the engraving mechanism differs with a relative small amplitude (from fractions of millimeter to several millimeters), and the possibility of accurate time measurement are hundreds and thousands of megahertz, it is better to perform calculations of the velocity by the time measurement method of the passed fixed path (V=Sconst/T).

Initially, the actuator's position is set by the control system, based on a signal received from the Hall sensor. In operation, based on an actual stop position of the impact tool on the processed surface, the actuator's position is corrected on the basis of a difference of the actual location of the impact point and the predetermined location.

The instant inventor has developed a software program and used it to control the inventive actuator.

What is claimed is:
1. An actuator of an engraving machine, said actuator is associated with a control system; said actuator includes an engraving head (1) comprising:
a housing (2) including:
a bottom opening;
a lower part containing at least two circular elastic membranes (13) having an internal contour and an external contour, said membranes (13) are vertically spaced and secured essentially to the housing (2) along the external contour; and
an upper part containing a sleeve (3) enclosing:
an upper support flange (32), essentially connected to said housing (2);
a ring-shaped permanent magnet (4);
a ring-shaped magnetic circuit washer (5) located under said permanent magnet (4), wherein said washer (5) has a top and a lower butt end lying in a radial plane;
a core (6) made of material conducting magnetic flux, said core (6) is coupled with a pivot (7) located on the top of said core (6) above said permanent magnet (4); wherein said core (6) has a lower butt end lying in the radial plane of said lower butt end of the washer (5), and a ring gap (10) is arranged between the core (6) and the permanent magnet (4);
a bottom cover (16) essentially closing the bottom opening, said cover (16) has a central orifice;
a pusher (11) attached to said internal contour of the membranes (13), said pusher (11) has a lower part;

a shank (15) secured in said lower part of the pusher (11), wherein said shank (15) is so mounted to project downward through the central orifice of said bottom cover (16), said shank (15) has a central part (17) including an axial opening (18);

an electrical coil (8) having an upper portion, said coil (8) is connected to said control system, said coil (8) is wound on a cylindrical carcass (9) made of non-magnetic material and attached to said pusher (11), wherein said core (6) is mounted inside said carcass (9), and the coil (8) is capable of vertical movement such that said upper portion of the coil (8) enters or exits said ring gap (10); and an impact tool (19) mounted in said axial opening (18).

2. The actuator according to claim 1, wherein said cylindrical carcass (9) has a lower part, and said cylindrical carcass (9) is fixedly or detachably connected to said pusher (11); and said actuator further includes:
   a position sensor (23) secured essentially to said housing (2);
   a mating part (22) essentially secured on said lower part of the cylindrical carcass (9);
   wherein said position sensor (23) is connected to said control system, and said mating part (22) interacts with said position sensor (23) such that the position sensor (23) is capable of measuring a position of said mating part (22) in relation to said position sensor (23).

3. The actuator according to claim 1, wherein:

said shank (15) has a stepped ledge with a first diameter, the stepped ledge is located above the central part (17); the central orifice of said bottom cover (16) has a second diameter; and the first diameter is greater than the second diameter thereby limiting a downward movement of the pusher (11); and said actuator further includes an adjusting screw (25) mounted on said core (6), wherein said adjusting screw (25) limits an upward movement of the pusher (11).

4. The actuator according to claim 1 wherein:

said impact tool (19) is made of magnetic material;

said actuator further includes a permanent magnet (20) mounted in the axial opening (18);

wherein said impact tool (19) is secured by said permanent magnet (20) in the axial opening (18).

5. The actuator according to claim 4 wherein said central part (17) has a lower butt end;

said impact tool (19) has a support stepped expansion (26) having an upper butt end;

said actuator further includes a polymer ring gasket (27) mounted between said lower butt end of the central part (17) and said upper butt end of the support stepped expansion (26).

6. The actuator according to claim 1 wherein:

said membranes (13) are configured with ring crimps; said membranes (13) are crimped by rings (29) along said internal contour; said membranes (13) are crimped by rings (30) along said external contour; and said actuator further includes spacer bushings (28) mounted on said pusher (11) between said membranes (13).

7. The actuator according to claim 1 wherein said membranes (13) are made of textile material impregnated with a Bakelite lacquer or polymer binder.

* * * * *